US012210350B2

(12) United States Patent
McLachlan et al.

(10) Patent No.: US 12,210,350 B2
(45) Date of Patent: Jan. 28, 2025

(54) SYSTEMS AND METHODS FOR MATERIAL HANDLING VEHICLE TRAVEL CONTROL BASED ON OBJECT DETECTION SYSTEMS

(71) Applicant: The Raymond Corporation, Greene, NY (US)

(72) Inventors: Robert P. McLachlan, Walton, NY (US); Anthony V. D'Accolti, Manlius, NY (US); Joseph T. Yahner, Chenango Forks, NY (US); Joel N. Sunny, Mineola, NY (US)

(73) Assignee: The Raymond Corporation, Greene, NY (US)

( * ) Notice: Subject to any disclaimer, the term of this patent is extended or adjusted under 35 U.S.C. 154(b) by 255 days.

(21) Appl. No.: 17/828,806

(22) Filed: May 31, 2022

(65) Prior Publication Data

US 2022/0390955 A1       Dec. 8, 2022

Related U.S. Application Data

(60) Provisional application No. 63/195,125, filed on May 31, 2021.

(51) Int. Cl.
*B66F 9/075*       (2006.01)
*G05D 1/00*        (2024.01)
*G05D 13/66*       (2006.01)
*G05D 107/70*      (2024.01)

(52) U.S. Cl.
CPC .........  *G05D 1/0223* (2013.01); *B66F 9/0755* (2013.01); *B66F 9/07568* (2013.01); *G05D 1/0238* (2013.01); *G05D 13/66* (2013.01); *G05D 2107/70* (2024.01)

(58) Field of Classification Search
None
See application file for complete search history.

(56) References Cited

U.S. PATENT DOCUMENTS

| 10,466,709 | B2 | 11/2019 | Kurata et al. |
| 11,110,957 | B2 | 9/2021 | Stewart et al. |
| 11,181,926 | B2 | 11/2021 | Shalev-Shwartz et al. |
| 11,222,251 | B2 | 1/2022 | Simon et al. |
| 11,231,714 | B2 | 1/2022 | Zhang et al. |
| 2012/0078471 | A1 | 3/2012 | Siefring et al. |
| 2015/0253775 | A1 | 9/2015 | Jacobus et al. |

(Continued)

FOREIGN PATENT DOCUMENTS

EP         0936517 A2      8/1999

OTHER PUBLICATIONS

European Patent Office, Extended Search Report, Application No. 22176368.3, Apr. 3, 2023, 14 pages.

*Primary Examiner* — Todd Melton
(74) *Attorney, Agent, or Firm* — Quarles & Brady LLP

(57) ABSTRACT

Systems and methods provide a travel control system to augment a supplemental object detection system of a material handling vehicle. Speed limits can be calculated for material handling vehicles based on properties of the vehicle, and a field of view of the object detection systems of the material handling vehicle. For given steer angles or ranges of steer angles, the speed of the material handling vehicle can be limited to ensure that the vehicle could stop before contact with a newly-detected object that was previously outside the field of view of the object detection system.

20 Claims, 11 Drawing Sheets

(56) References Cited

U.S. PATENT DOCUMENTS

| | | |
|---|---|---|
| 2016/0282874 A1 | 9/2016 | Kurata et al. |
| 2018/0059682 A1 | 3/2018 | Thode |
| 2020/0216085 A1 | 7/2020 | Bobier-Tiu et al. |
| 2021/0061269 A1 | 3/2021 | Petroff et al. |
| 2022/0242232 A1* | 8/2022 | Oetken ............... B60W 30/146 |

* cited by examiner

SYSTEMS AND METHODS FOR MATERIAL HANDLING VEHICLE TRAVEL CONTROL BASED ON OBJECT DETECTION SYSTEMS

CROSS-REFERENCES TO RELATED APPLICATIONS

This application is based on, claims priority to, and incorporates herein by reference in its entirety, U.S. Provisional Patent Application No. 63/195,125, filed on May 31, 2021, and entitled "Systems and Methods for Material Handling Vehicle Travel Control Based on Object Detection Systems."

STATEMENT REGARDING FEDERALLY SPONSORED RESEARCH

Not Applicable.

BACKGROUND

For particular environments of use, some material handling vehicles employ object detection systems. An object detection system as applied to a material handling vehicle is a supplemental system that scans for the presence of objects within the field of view of the object detection system, and can control travel speed or other travel characteristics as a function of objects detected in the path of the material handling vehicle. A supplemental system such as an object detection system can serve as a training reinforcement and supervisory tool.

For certain types of vehicles that are manually operated, there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment.

BRIEF SUMMARY

The present disclosure relates generally to material handling vehicle travel control, and, more specifically, to systems and methods for material handling vehicle travel control based on intrinsic aspects of the material handling vehicle and the material handling vehicle's object detection system.

In some aspects, a travel control system can augment a supplemental object detection system of a material handling vehicle. The system can include a material handling vehicle, a steer angle sensor, a speed sensor, a motor control unit, and a processor. The processor can be operatively connected to the steer angle sensor, the speed sensor, and the motor control unit. The processor can be configured to determine, based on intrinsic information of the material handling vehicle, a first speed limit associated with a first breakpoint angle. The processor can receive, from the steer angle sensor, a first steer angle. The processor can receive, from the speed sensor, a first vehicle speed. When the first steer angle exceeds the first breakpoint angle, and the first speed exceeds the first speed limit, the processor can generate a signal to the motor control unit to decrease a speed of the material handling vehicle.

In some aspects, a method in a computer-implemented system for controlling travel of a material handling vehicle, can include receiving at a control system of the material handling vehicle, intrinsic aspects of the material handling vehicle. Based on the intrinsic aspects of the material handling vehicle and a configuration of a scanner mounted on the material handling vehicle at least one speed limit associated with at least one steering angle range of the material handling vehicle can be determined. The control system can receive a speed of the material handling vehicle. The control system can further receive a current steering angle of the material handling vehicle. When the current steering angle is within the at least one steering angle range and the current speed exceeds the at least one speed limit associated with the at least one steering angle range, a signal can be generated to a motor control unit to reduce a speed of the material handling vehicle.

In some aspects, a computerized control system for a material handling vehicle can comprise an object detection system of the material handling vehicle. The material handling vehicle can include at least one scanner having a field of view defined between a first boundary and a second boundary. The material handling vehicle can further include a motor control unit, one or more processors, and a memory storing one or more programs for execution by the one or more processors. The one or more programs can include instructions for performing a method for controlling a travel of the material handling vehicle. The method can include receiving at the one or more processors a current speed of the material handling vehicle and a current steering angle of the material handling vehicle. Based at least in part on the current speed and current steering angle, a stopping distance of the material handling vehicle can be determined. The method can determine if the stopping distance is within the scanner field of view. If the stopping distance is outside of the scanner field of view, a signal can be generated to the motor control unit to reduce a speed of the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
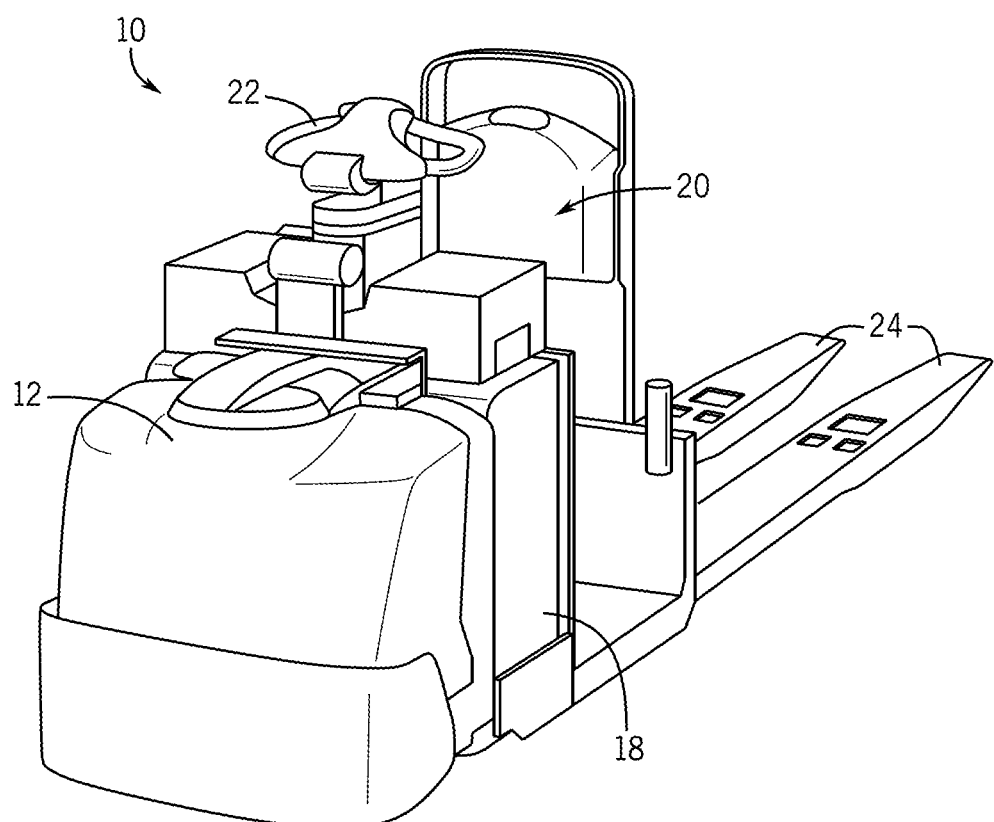
FIG. 1 is a front-left side perspective view of a material handling vehicle according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles are designed in a variety of classes and configurations to perform a variety of tasks. It will be apparent to those of skill in the art that the present disclosure is not limited to any specific material handling vehicle, and can also be provided with various other types of material handling vehicle classes and configurations, including for example, lift trucks, fork-lift trucks, reach trucks, SWING REACH® vehicles, turret trucks, side loader trucks, counterbalanced lift trucks, pallet stacker trucks, order pickers, transtackers, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles.

Embodiments of the disclosure can include an object sensing system to provide onboard object sensing to the material handling vehicle. The object sensing system can add support for and reinforce operator training and supervision on a manned material handling vehicle. The object sensing system can include an onboard object sensing unit and a processing unit to initiate material handling vehicle operator indications as training reinforcement and potentially controlling material handling vehicle functionality under defined operating conditions. In some embodiments, the processing unit can comprise a telematics system, for example the iWAREHOUSE® material handling vehicle fleet management system from The Raymond Corporation.

The object sensing system can serve as a training reinforcement tool to among other things provide notice regarding a material handling vehicle's proximity to other objects that is consistent with customer facility rules in the warehouse environment. It is not intended as a replacement for the training requirements that an operator always look in the direction of travel, be aware of his or her proximity to other objects at all times, assume and maintain a proper operator position and follow various aspects of their operator training.

The object sensing system can use a scanner (can also be referred to as a sensor) to detect objects within a warehouse, e.g., within an aisle and outside of aisles of a warehouse, while the material handling vehicle is traveling in the tractor first direction, and in some embodiments, while the material handling vehicle is traveling in the fork first direction. If an object is detected, the material handling vehicle equipped with the object sensing system can provide an indication to the operator, such as displaying "Sensor Stop" on the material handling vehicle operator display, an audible tone can sound, and/or a haptic feedback can be initiated, or any combination. The indication(s) to the operator can be provided in a multi-tiered fashion, e.g., first a message can be displayed, then an audible tone can sound, and next a haptic feedback can be initiated. One or more of these indications to the operator can be initiated allowing the operator to initiate a material handling vehicle command to decelerate to a slower speed, or to a stop depending on the distance to the detected object, and if neither occurs, then the material handling vehicle will systematically be put in a similar state (slow or stop). If the material handling vehicle slows or stops, not all indications to the operator may be initiated. For example, if the material handling vehicle slows or stops before the haptic feedback is provided, the haptic feedback may not be provided to the operator. The operator will maintain full control of the material handling vehicle equipped with object sensing system at all times.

In some embodiments, a warehouse management system, or a facilities manager, in exercising their duty to supervise operation of their forklift fleet, may be able to adjust the functionality of the object sensing system to meet operational conditions resident in their facility. For example, the facilities manager could set a minimum and a maximum desired speed for use by the object sensing system when the object sensing system is sensing an object to initiate a slower travel condition.

In some embodiments, the scanner can be a two dimensional scanner. In some embodiments, the scanner can have more than one sensing field. In some embodiments, more than one scanner can be included to provide more than one sensing field. Thus, the scanner can be a first scanner, and the object sensing system can further include a second scanner, a third scanner, or any number of scanners to achieve a desired combined field of view for the object sensing system. In some embodiments, a three dimensional scanner can be used. In some embodiments, a spatial scanner can be used. Each of the various scanner options can be used in any combination and can allow the scanner or scanners to be configured using scanner supplier supported software tools.

In some embodiments, the object sensing system can implement various scanner types, including R2100 (Multi-Ray LED Scanner (2-D LiDAR sensor)), SICK TIM 781-2174101 2-D LiDAR sensor or similar, and Radar, as non-limiting examples. In some embodiments, the object sensing system using any of the exemplary scanner types identified above, can support the rPORT™ technology from The Raymond Corporation, which allows for an open architecture with a standardized interface. In other embodiments, a discrete I/O implementation can also be used.

In some embodiments, raw data of the object sensing system can be processed to produce granularity that can improve an accuracy and performance of the object sensing system, relative to conventional scanner systems. This can provide a more robust object sensing system relative to conventional systems that can rely on processing systems provided by a vendor of a scanner. For example, a field of view, the disclosed scanner can sense fields correlating to a speed from 0 to 9 miles per hour in tenth of a mile intervals and can scan sections of the field of view in an interval of hundredths of a degree. Thus, fields can be generated for a scanner to more accurately sense an object, and the number of possible fields can be the product of the number of angular sections in hundredths of degrees of the viewing angle, and the number of speed intervals (e.g., 10 times 9).

In addition to, or in place of possible placement of the scanner as shown in the various figures, the scanner(s) can be mounted in various locations on the material handling vehicle.

The present disclosure can function as training reinforcement for operator driven material handling vehicles. The present disclosure can function to augment the functionality of a supplemental object detection system on a manned or unmanned material handling vehicle by controlling components affecting vehicle travel based on intrinsic aspects of the material handling vehicle and/or the material handling vehicle operating environment. Intrinsic aspects of a material handling vehicle can include vehicle weight, vehicle height, vehicle width, drive wheel location, and non-drive wheel locations, as non-limiting examples. Intrinsic aspects of an object detection system on a material handling vehicle can include sensing range, sensing view angle, sensing height, shape of the detection zone, and physical position of the scanner, as non-limiting examples.

A travel control system can be integrated with the supplemental object detection system as an object detection augmentation, and can assist in controlling any combination of aspects of vehicle travel including speed, steer angle, load handling devices and attachments, and/or mast height, based on the intrinsic aspects of the object detection system on the material handling vehicle including sensing range, sensing view angle, sensing height, shape of the detection zone, and physical position of the scanner.

In some embodiments, the travel control system can make a distinction for a material handling vehicle pivoting on or about a point. The pivot behavior can be customizable to enable maneuverability with the travel control system.

Figure 2:
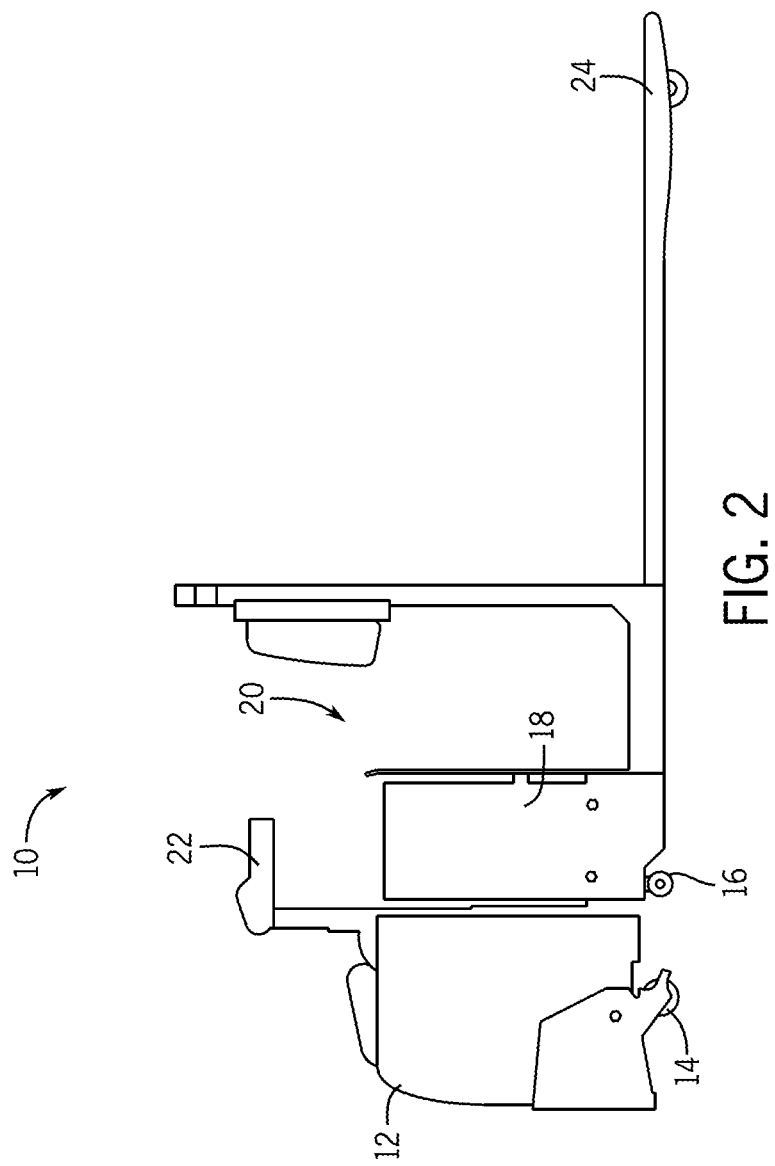
FIG. 2 is a plan view of the material handling vehicle of FIG. 1.

FIGS. 1 and 2 illustrate a non-limiting example of a material handling vehicle 10 according to the present disclosure. The material handling vehicle 10 may include a vehicle frame 12, a steerable traction wheel 14, a fixed axle 16, a power section 18, and an operator compartment 20. The power section 18 may be disposed within the vehicle frame 12 and may include a battery (or other power source) configured to supply power to various components of the material handling vehicle 10. For example, a battery may supply power to a motor (not shown) and/or transmission (not shown) disposed within the power section 18 and configured to drive the traction wheel 14. In the illustrated non-limiting example, the traction wheel 14 is arranged under the power section 18. In other non-limiting examples, a traction wheel(s) 14 may be arranged in another location under the vehicle frame 12.

The operator compartment 20 may include a control handle 22 configured to provide a user interface for an operator and to allow the operator to control a speed and direction of travel of the material handling vehicle 10. In some non-limiting examples, the control handle 22 may be configured to manually steer and control power to the traction wheel 14. In the illustrated non-limiting example shown in FIGS. 1 and 2, the material handling vehicle 10 includes a pair of forks 24 configured to engage loads (e.g., a pallet). The forks 24 can be raised and lowered by an actuator (not shown) to lift/place loads. In some non-limiting examples, forks can be coupled to a mast and be raised or lowered via actuators in response to commands from a control handle.

The material handling vehicle 10 can be operated by an operator and can be capable of picking, placing, transporting, or otherwise manipulating a load, possibly including a pallet. In various examples, the operator controls the material handling vehicle 10 so that the forks 24 engage a pallet carrying a load. In so doing, the operator may extend or retract actuators (not shown) to pick, place, engage, or otherwise manipulate the load. Once the load is situated on the forks 24, the operator can move the load to another location as needed. In some non-limiting examples, a human operator may be replaced with an automated controller to comprise a fully-automated system (i.e., an autonomously guided material handling vehicle).

Figure 3A:
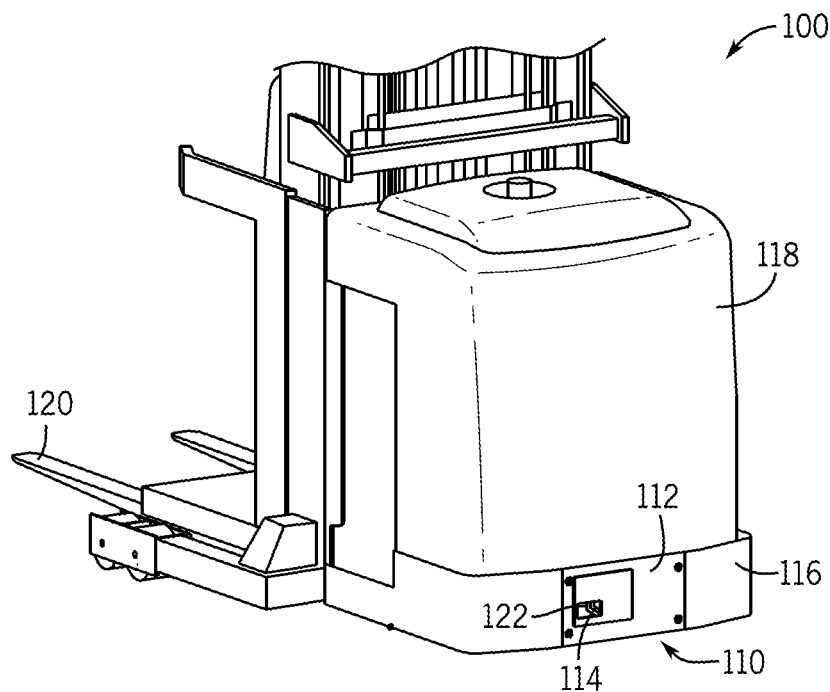
FIGS. 3A and 3B show an exemplary object detection system and associated scanner view angle according to aspects of the present disclosure.
Figure 3B:
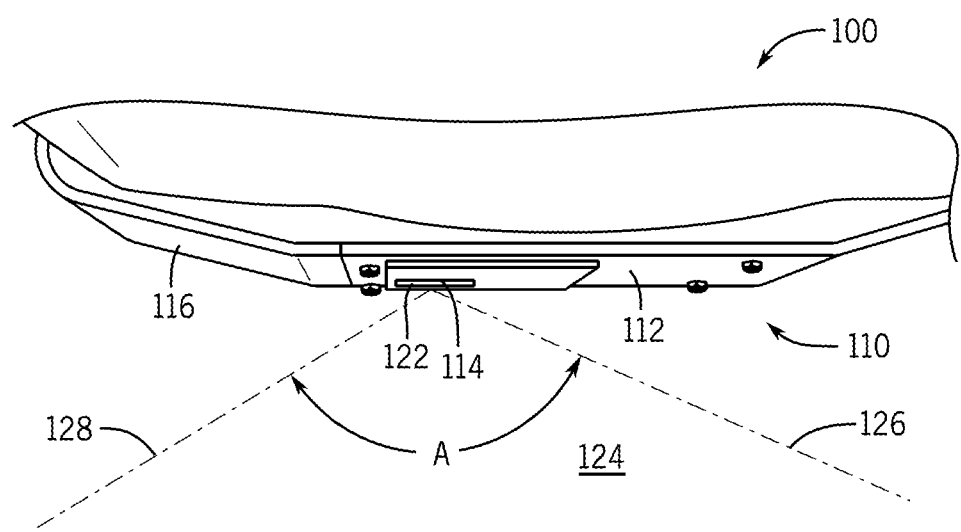

Material handling vehicles, including the material handling vehicle 10 illustrated in FIGS. 1 and 2, can include systems for detecting objects in a path of travel. These systems can include scanners, which can have a defined field of view, and can scan for objects within the field of view. Referring to FIGS. 3A and 3B, a preferred embodiment of a material handling vehicle 100 with an object detection system 110 is shown, the material handling vehicle 100 being generally similar to material handling vehicle 10. The object detection system 110 can include a mounting plate 112 and a scanner 114, which, in the illustrated embodiment, comprises a LiDAR scanner 114. The object detection system 110 can be positioned on a material handling vehicle in a way that is advantageous to sensing objects that may impede travel for the vehicle. As illustrated, for example, the object detection system 110 is positioned on a lower portion 116 of a front side 118 of the material handling vehicle 100, the front side 118 being the side of the material handling vehicle 100 opposite a set of forks 120. In some embodiments, a material handling vehicle may travel primarily in a "tractor first" direction, with a front side of a material handling vehicle generally facing in the direction of travel, and forks of the material handling vehicle extending in a direction opposite the direction of travel. Thus, in the illustrated embodiment, the LiDAR scanner 114, being mounted on the front side 118, can scan an area in a direction of travel of the material handling vehicle. Being mounted on the lower portion 116, the LiDAR scanner 114 is advantageously positioned to detect objects or obstructions along a floor surface that could otherwise be undetected if the scanner 114 were mounted higher on the material handling vehicle 100.

The LiDAR scanner 114 may be housed within the lower portion 116, and the mounting plate 112 can provide a protective covering for the scanner 114. As illustrated in FIG. 3B, the mounting plate can define a cut-out portion 122, which can provide a window through which the scanner 114 can scan the environment of the material handling vehicle 100. The scanner 114 can have a maximum viewing angle A between a first boundary 126 and a second boundary 128, which can be dependent upon the internal placement of the scanner 114 in combination with the dimensions of the cut-out portion 122 and can further define a field of view 124. In some configurations, the viewing angle A can be up to about 110 degrees, or up to about 120 degrees, or up to about 130 degrees. In some embodiments where the material handling vehicle includes more than one scanner, and therefore more than one scanner field of view, the scanner field data can be combined and can be used in a travel control system (e.g., travel control system 200 shown in FIG. 5) for calculating an allowed or disallowed travel path for a material handling vehicle.

Figure 4A:
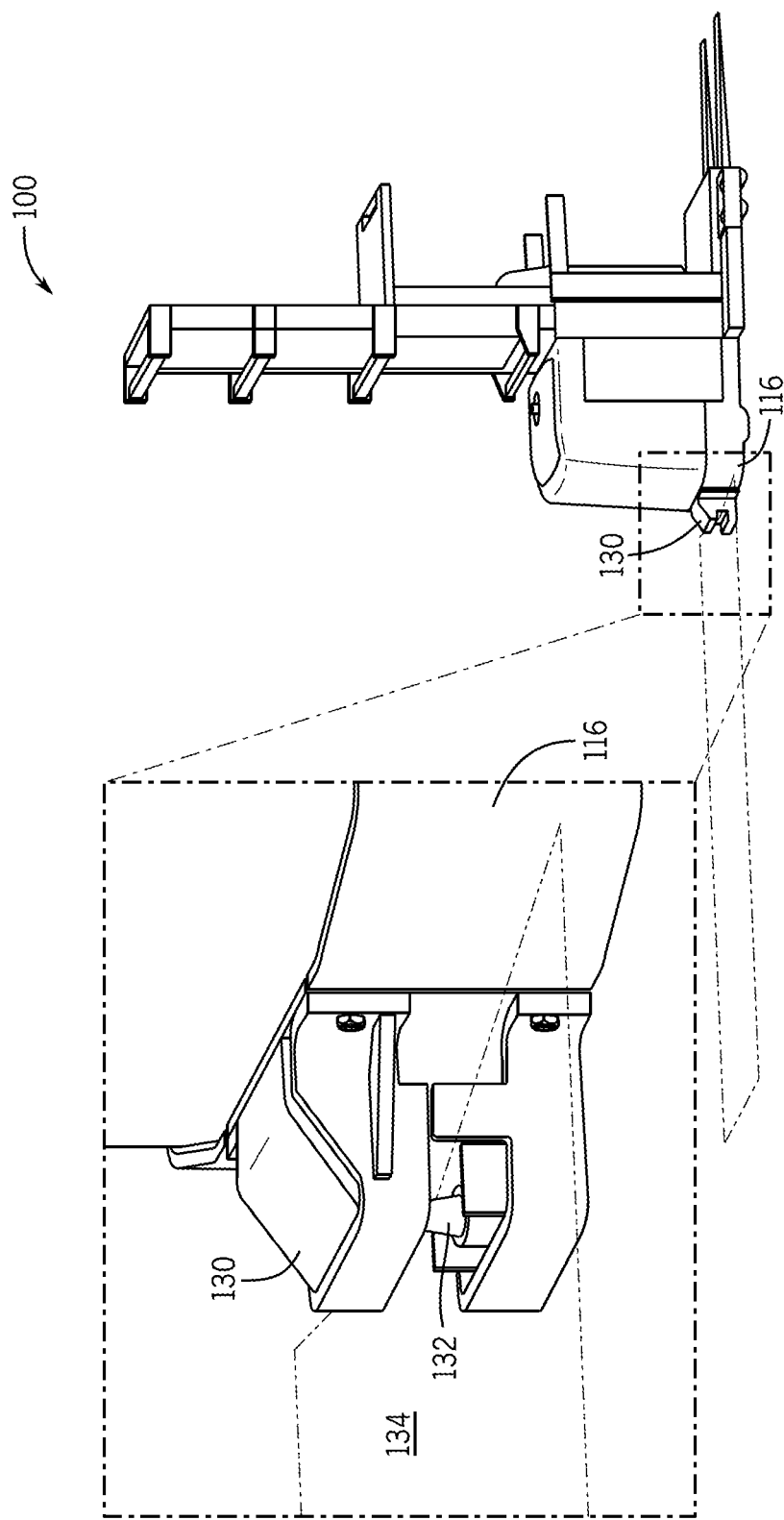
FIGS. 4A and 4B show an exemplary object detection system and associated scanner view angle according to aspects of the present disclosure.
Figure 4B:
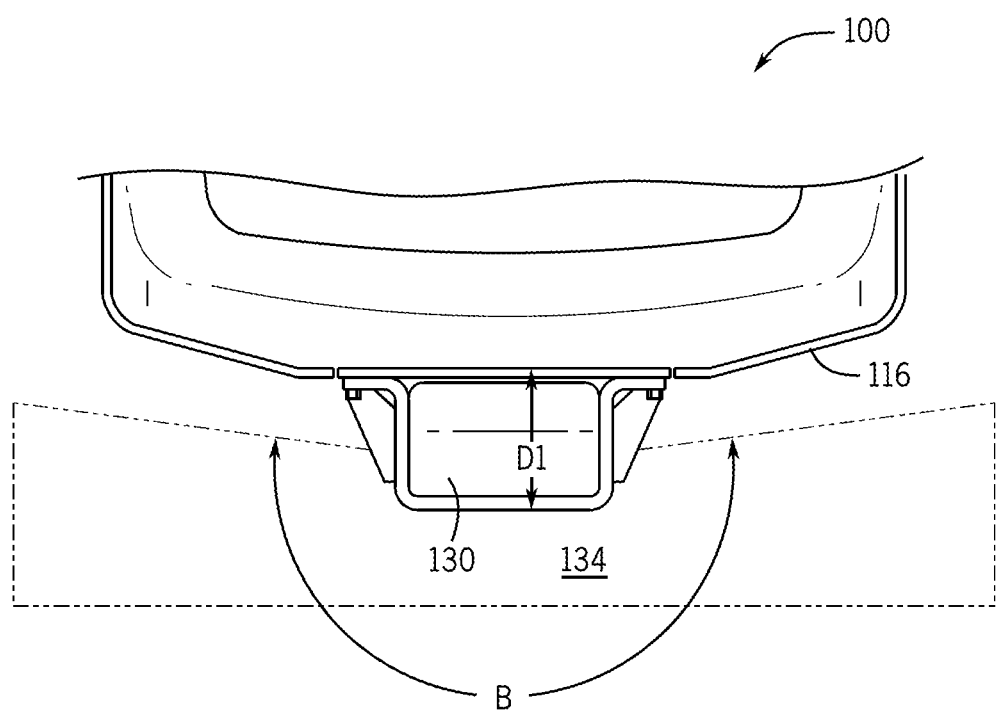

In other embodiments, including as illustrated in FIGS. 4A and 4B, a scanner or LiDAR can be mounted on a material handling vehicle in other configurations, which can, for example, increase a field of view of the scanner. As illustrated, a material handling vehicle 100 can include a scanner assembly 130, which can be mounted on a lower portion 116 of the material handling vehicle 100, along a front face. The scanner assembly 130 can extend outwardly from the lower portion 116 by a distance D1. A scanner 132 can be mounted within the assembly 130, and can scan an area in front of, and on lateral sides of the scanner 132. Thus, the scanner 132 could have a viewing angle B which is larger than viewing angle A and defines a field of view 134 having a greater area than field of view 124. In some configurations, viewing angle B can be greater than 180 degrees.

When a trajectory of the material handling vehicle changes, as, for example, when the steering angle changes, a field of view of an object detection sensor or scanner of the vehicle may change. In some instances, when a steering angle of a material handling changes, this change can bring a previously undetected object into a path of the material handling vehicle, and, in some instances, absent system correction, the material handling vehicle may be travelling too quickly to avoid contact with the undetected object. Further, when a field of view changes, an object detection system may require an amount of time to scan the new field of view for objects that may impede travel. Thus, systems can be provided for a material handling vehicle that can limit a speed of the material handling vehicle in response to a change in trajectory, to mitigate possible contact with previously undetected objects.

Figure 5:
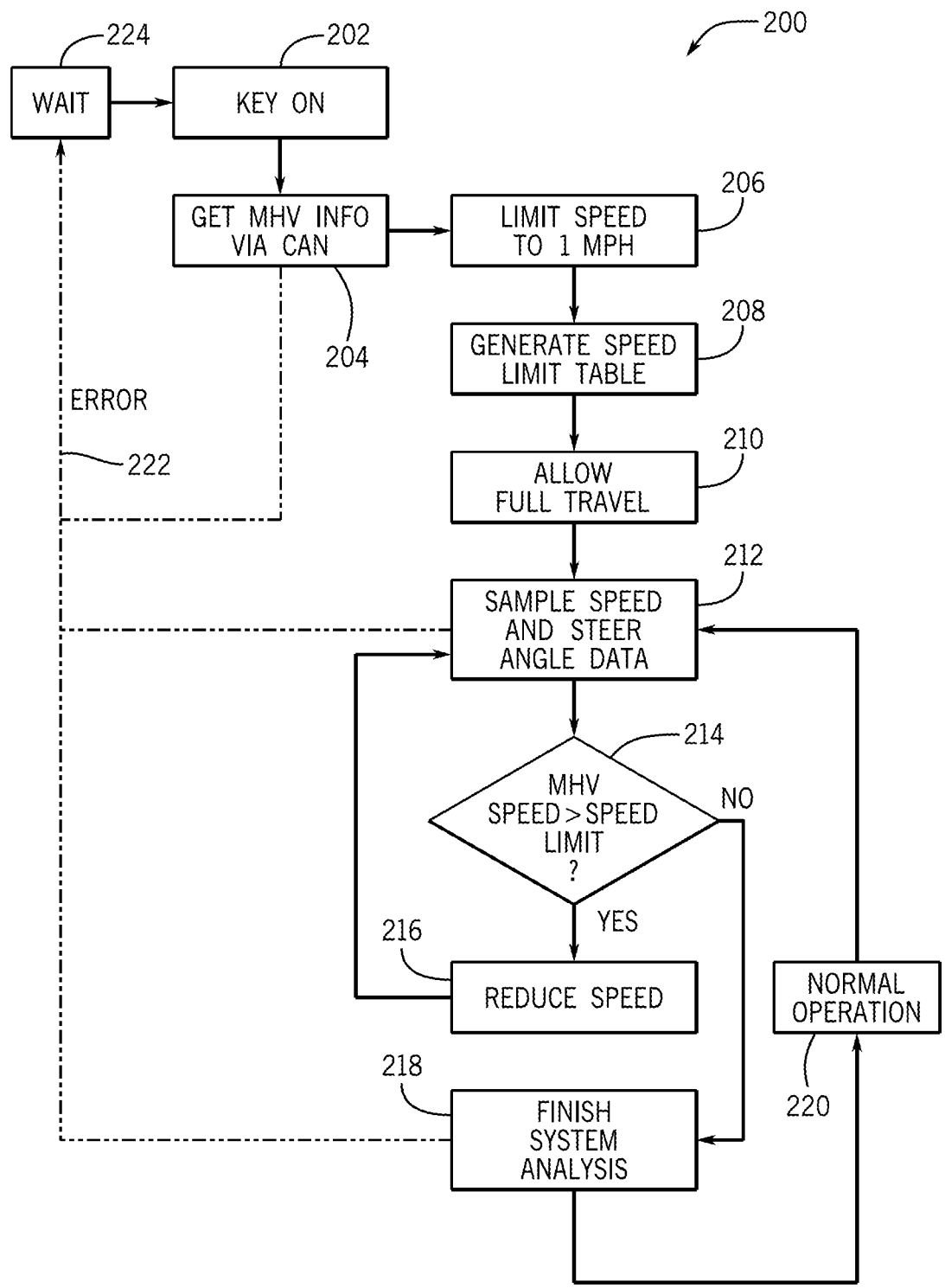
FIG. 5 is a flowchart of a travel control system according to aspects of the present disclosure.
Figure 6:
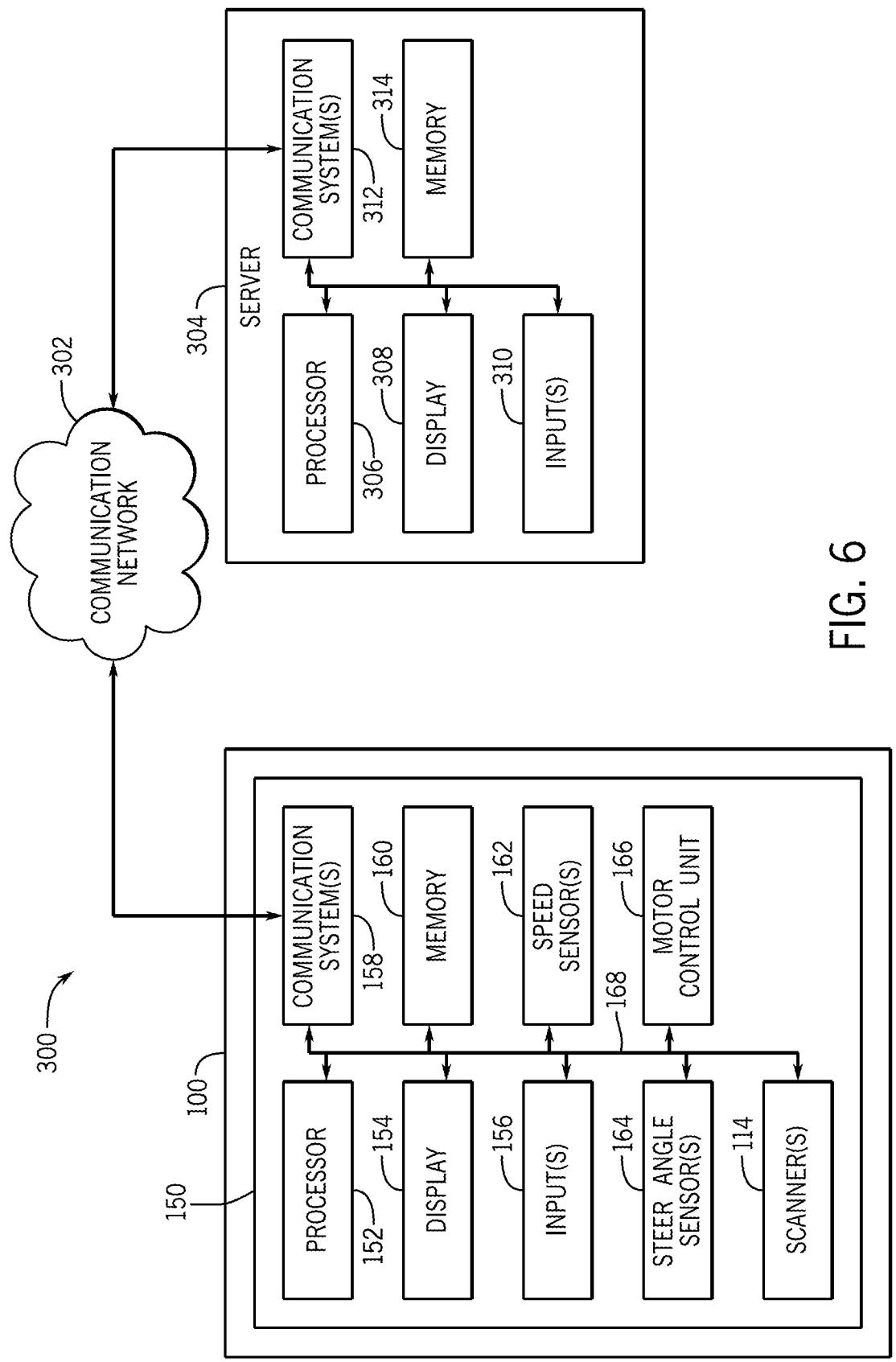
FIG. 6 is a schematic block diagram of a computerized system for implementing the system of FIG. 5 illustrating one, non-limiting configuration.

FIG. 5 illustrates an exemplary embodiment of a travel control system 200 for a material handling vehicle (e.g., material handling vehicles 10, 100), which can be implemented by a control system 150 (e.g., as shown in FIG. 6) of the material handling vehicle 100. As will be described, the travel control system 200 can calculate speed limits based on properties of a material handling vehicle and define potential and allowed travel paths of the material handling vehicle. The process can start at step 202, with a material handling vehicle being keyed on. At this step, one or a series of processes can be initiated to power operation of the material handling vehicle. For example, an engine of the material handling vehicle can be started, a start-up sequence for a control system can be initiated, etc.

At step 204, properties of a material handling vehicle can be obtained. Information obtained at step 204 can include physical properties of the material handling vehicle 100, and can be used to determine speed limits, allowed and disallowed paths of the material handling vehicle 100 for different dynamic conditions, such as a steer angle or range of steering angles. For example, the information can include intrinsic aspects of the material handling vehicle 100, which can include vehicle weight, vehicle height, vehicle width, drive wheel location, and non-drive wheel locations, as non-limiting examples. This information can be received at a processor 152 of control system 150 of the material handling vehicle and used to calculate maximum speed limits for different conditions of operation of the material handling vehicle. FIG. 6, for example, illustrates an exemplary communication system 300 for computing elements that can allow the control system 150 of the material handling vehicle 100 to obtain information about the material handling vehicle either from a memory 160 of the control system 150, or from a remote computing system 304.

As illustrated in FIG. 6, material handling vehicle 100 can include the control system 150, which can include a processor 152, a display 154, one or more inputs 156, one or more communication systems 158, and/or memory 160. The control system can also include the scanner 114, speed sensors 162, steer angle sensors 164, and a motor control unit 166. In some embodiments, processor 152 can be any suitable hardware processor or combination of processors, such as a central processing unit (CPU), a graphics processing unit (GPU), an application specific integrated circuit (ASIC), a field-programmable gate array (FPGA), etc. In some embodiments, display 154 can include any suitable display device, such as a computer monitor, a touchscreen, a television, etc. In some embodiments, inputs 156 can include any suitable input devices and/or sensors that can be used to receive user input, such as a keyboard, a mouse, a touchscreen, a microphone, a camera, etc.

In some embodiments, communications systems 158 can include any suitable hardware, firmware, and/or software for communicating information over communication network 302 and/or any other suitable communication networks. For example, communications systems 158 can include one or more transceivers, one or more communication chips and/or chip sets, etc. In a more particular example, communications systems 158 can include hardware, firmware and/or software that can be used to establish a Wi-Fi connection, a Bluetooth connection, a cellular connection, an Ethernet connection, etc.

In some embodiments, memory 160 can include any suitable storage device or devices that can be used to store instructions, values, etc., that can be used, for example, by processor 152. Memory 160 can include any suitable volatile memory, non-volatile memory, storage, or any suitable combination thereof. For example, memory 160 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 260 can have encoded thereon a computer program for controlling operation of material handling vehicle 100, including by implementing all or part of the travel control system 200 illustrated in FIG. 5. Information, including intrinsic properties of the material handling vehicle 100 can be static, and can be stored in the memory 160 of the material handling vehicle, and can be provided to the processor 152 for calculation of speed limit tables. In other embodiments, some information of the material handling vehicle 100 to be used in calculating speed limits can be dynamic information that can be obtained through sensors of the material handling vehicle. For example, a weight sensor or sensors (not shown) can be provided for a material handling vehicle, or for a load of the material handling vehicle, and can be used to calculate a stopping distance of the material handling vehicle.

In some embodiments, sensing elements and control units of the material handling vehicle can be operatively included in the control system 150. For example, a control system 150 can include steer angle sensors 164 for sensing a current steer angle of the vehicle, and the steer angle sensor 164 can produce a signal indicative of a steer angle which can be provided to the processor 152. In some embodiments, the steer angle can be sensed through a sensor 164 at a steering element (e.g., control handle 22 of material handling vehicle 10). The sensor 164 can be any sensor known in the art for measuring a steering angle of a vehicle, which in some non-limiting examples can include gyroscopes or accelerometers. In other embodiments, a steer angle can be calculated from an orientation of the material handling vehicle 100, which can be obtained through visual sensors, such as cameras, for example. Speed sensors 162 can also be provided for the material handling vehicle to sense a speed and communicate the speed to the processor 152. The speed sensor 162 can be any sensor known in the art for measuring a speed of a vehicle, including, but not limited to accelerometers or gyroscopes. A motor control unit 166 can be provided in the control system 150. The motor control unit 166 can be in communication with the processor 152 and can reduce a speed of a motor of the material handling vehicle 100 or set a limit on the speed of the material handling vehicle 100 based on a signal received from 152.

The elements of the control system 150 can communicate using standardized communication protocols. For example, the elements of a control system 150 can communicate over a controller area network ("CAN") bus 168, which can provide for communication between elements without the need for specific wired connections between each element in communication with other elements of the control system 250. Messages can be provided from a given element to the CAN 168, which each of the other elements are connected to, and the messages can be of a format to be consumed by the element for which it is intended. Thus, signals between elements, for example signals from the scanner 114 to the processor 152, or from the processor 152 to the motor control unit 166 can be contained in a message provided on the CAN bus 168.

In some embodiments, the control system 150 can be operatively connected to computing device 304 through a communication network 302. In some embodiments, the communications network 302 can be a local area network, a wide area network, etc. The computing device 304 can include processor 306, display 308, inputs 310, communication system 312, and memory 314 which can be similar to the corresponding components of control device 150. The memory 314 can include persistent memory which can store information about a material handling vehicle (e.g., material handling vehicle 100) or multiple material handling vehicles. Upon a request (e.g., a request received at communication system 312), the computing device 304 can return the information to the control system 150 of material handling vehicle 100 for use in object detection systems of the material handling vehicle 100. This information can be provided to the processor 152 directly via the CAN bus 168. Additionally or alternatively, the information can be provided from the communication system 158 to the memory 160 through messages sent on the CAN bus 168.

Referring back to FIG. 5, at step 206, a speed of the material handling vehicle 100 can be temporarily restricted until the travel control system 200 can generate a speed limit table. As shown, the temporary speed limit can be 1 mile per hour, but other configurations are possible. For example, in some embodiments, a temporary speed limit for a material handling vehicle could be about 0 mph, or 2 mph, or 3 mph. The temporary speed limit could be set by a manager of a facility, for example, via the inputs 156 of the control system 150. In other embodiments, the temporary speed limit could be hard-coded in memory 160, and can be included in the material handling vehicle information received at step 204.

Referring again to FIG. 5, at step 208, the travel control system 200, upon material handling vehicle startup, can generate a speed limit table of maximum speeds for the material handling vehicle 100 when the material handling vehicle 100 is steered at a given angle or within a given range of angles. These speed limits can be generated to minimize possible contact with objects that may not be in a field of view of a scanner of a material handling vehicle. For example, a speed that can be allowed in a first direction of travel can bring the material handling vehicle 100 into contact with an object outside of the field of view 124 if the speed is maintained when a material handling vehicle is steered toward a trajectory outside of the previous field of view 124. A non-limiting representative generated speed limit table is shown below. The steer angles shown are absolute values, and thus the associated speed limits would be applied to the corresponding negative steer angle.

| SPEED LIMIT | STEER ANGLE |
| --- | --- |
| 5.0 mph | 10 degrees |
| 4.0 mph | 20 degrees |
| 3.0 mph | 30 degrees |
| 2.0 mph | 40 degrees |
| 1.0 mph | 50 degrees |
| 3.0 mph | 75 degrees (Pivot) |

Speed limits for a material handling vehicle can be generated for certain dynamic conditions of the material handling vehicle, including steer angle. Although limiting the speed of a material handling vehicle can increase vehicle path travel time, the speed limit can allow a scanner (e.g., scanner 114) enough time to react to an object during a steering maneuver. As illustrated in the input-output diagram of FIG. 7, the travel control system 200 can implement an algorithm 350, which can receive inputs for a material handling vehicle dynamics model 352, a scanner location and field of view 354, a desired stop distance from an object 356, and desired steer angle breakpoints 358, and can output speed limits as a function of angle 360 (e.g., as shown in the representative generated speed limit table shown above).

The material handling vehicle dynamics model input at 352 can include the material handling information obtained at step 204 of the travel control system 200. For example, determining a speed limit for a given steering angle can require calculating a path of the vehicle, to determine a probability of a portion of the material handling vehicle contacting an object.

Figure 7:
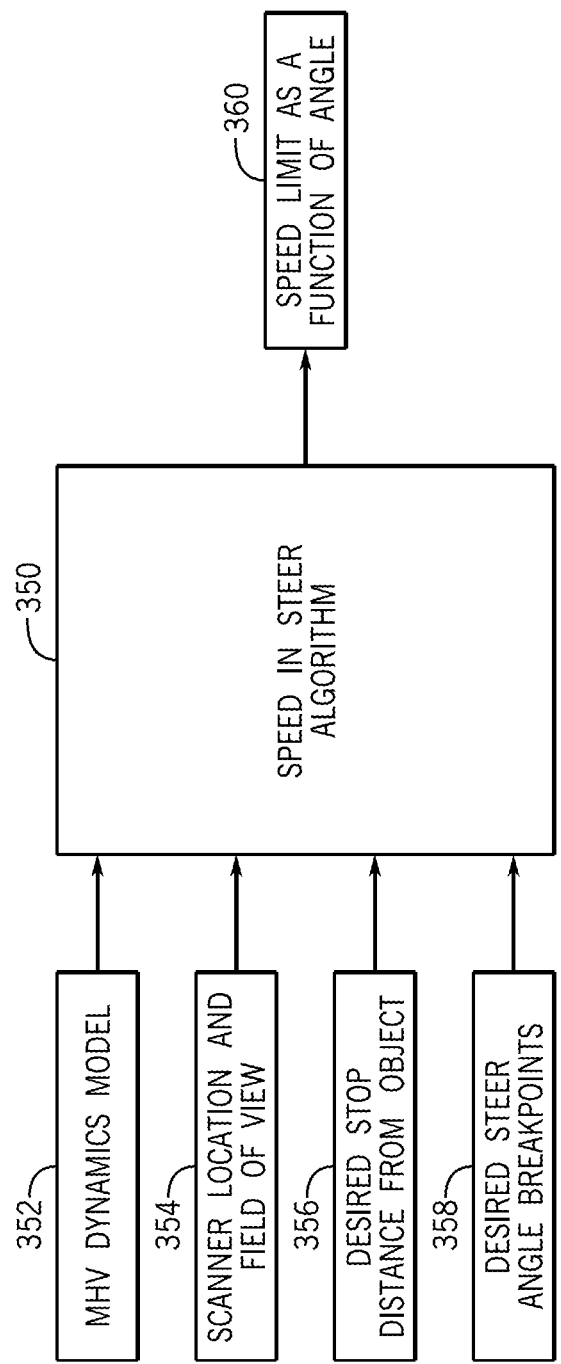
FIG. 7 is an input-output diagram showing an exemplary algorithm for determining speed limits of a material handling vehicle as a function of steering angle.
Figure 8:
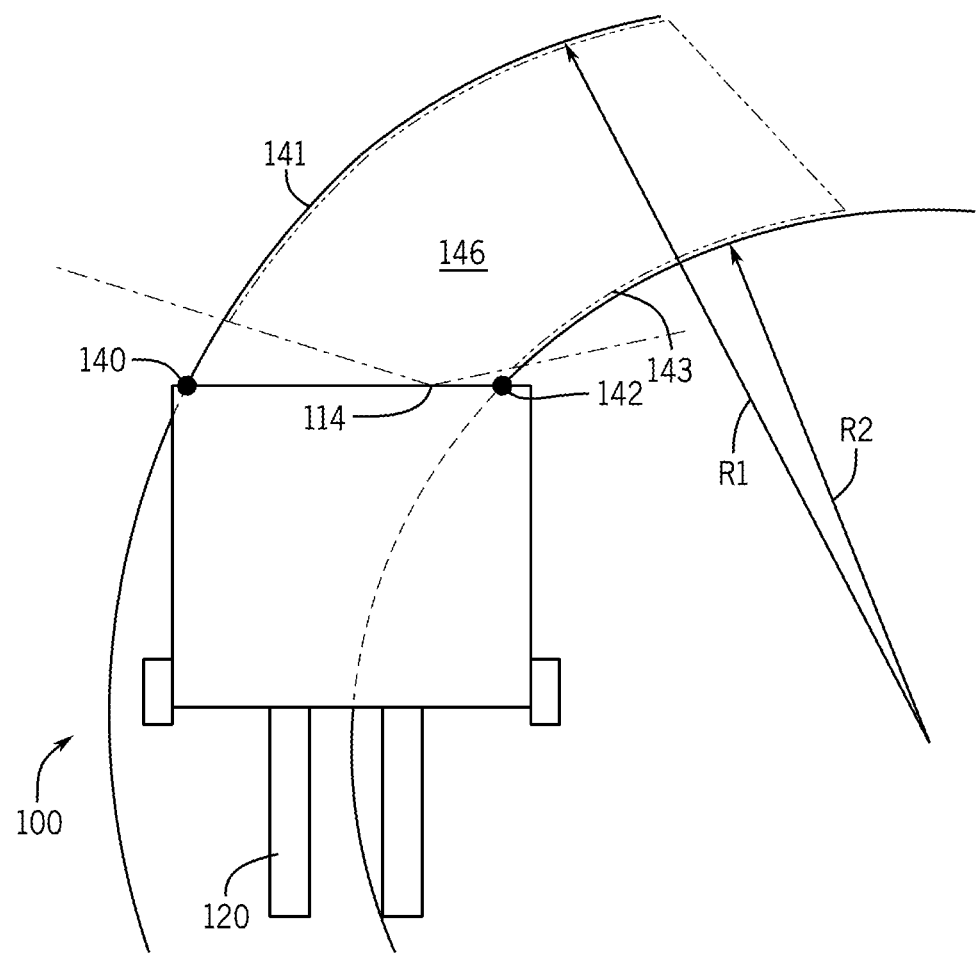
FIG. 8 illustrates exemplary intrinsic aspects of a material handling vehicle, according to aspects of the present disclosure.

Referring to FIG. 8, the described speed limits will vary by type of material handling vehicle and can be dependent upon the intrinsic aspects of the material handling vehicle (e.g., the material handling vehicle information received at step 204). For a steer drive material handling vehicle, as a non-limiting example, a travel path can be represented as two concentric circles, representing two selected edges of the material handling vehicle. Exemplary selected edges of steer drive material handling vehicle 100 are reflected in FIG. 7 at point 140 and point 142, which can be positioned on opposite lateral sides of material handling vehicle 100. In a turning operation, the point 140 can travel along a circumference 141 of a circle having a radius R1 and point 142 can travel along circumference 143 of a concentric circle with a radius R2. Collectively, the circumference 141 of the first circle and the circumference of the second circle 143 can define a projected path 146 of the material handling vehicle. Geometric properties of the concentric circle representing the travel path of respective points 140, 142 can be used in a calculation to determine the projected path 146 of the vehicle 100. The projected path can be used to calculate a speed limit of the material handling vehicle 100. For example, a speed limit can be determined to ensure that the projected path does not coincide or intersect with a disallowed travel path, based on other factors (e.g., a combination of the inputs 354, 356, 368).

Figure 9:
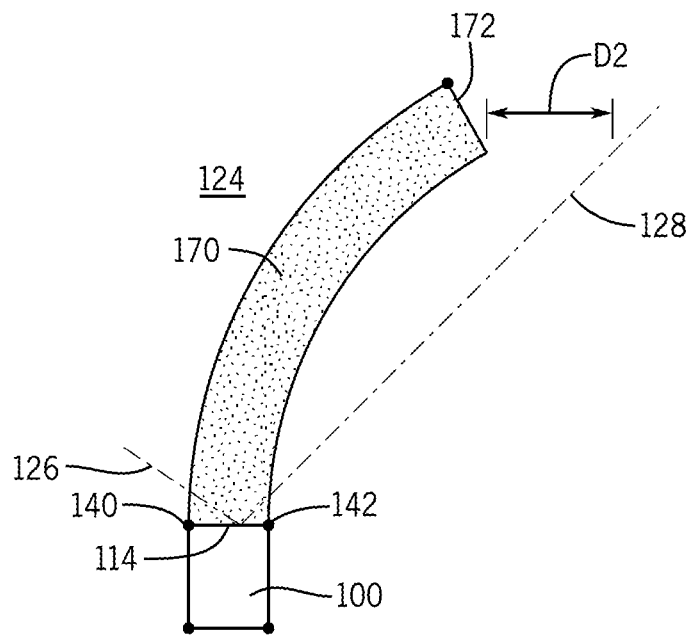
FIG. 9 illustrates an exemplary travel path and stopping distance of material handling vehicle shown in FIGS. 1-4B, according to aspects of the present disclosure.

The dimensions of the material handling vehicle 100 can be combined with other aspects of the material handling vehicle 100 in a dynamics model for calculating a speed limit for the material handling vehicle for a given steering angle or range of steering angles. In some embodiments, a speed limit for a given steering angle can be determined in part based on a stopping distance for a given trajectory. In this regard, FIG. 9 illustrates a projected path 170 of material handling vehicle 100, which, as shown, is traveling at a rate of 4.7 mph with a steering angle of 13 degrees. Line 172 illustrates a stopping distance, which is the distance at which the material handling vehicle 100 could safely be stopped given an initial trajectory, position, and steering angle of the vehicle. A material handling vehicle having a greater weight may also have a greater stopping distance, as it can require more energy to slow, while a stopping distance of a vehicle having comparatively less weight would be shorter. The stopping distance 172 can factor into the calculation of a speed limit of a material handling vehicle for different steering angles, as reducing a speed of the material handling vehicle 100 can provide an object sensing system 110 time to adjust to scan the new direction of travel, while also ensuring that the vehicle 100 is not travelling at a rate that is likely to cause contact with a newly discovered object.

Figure 10:
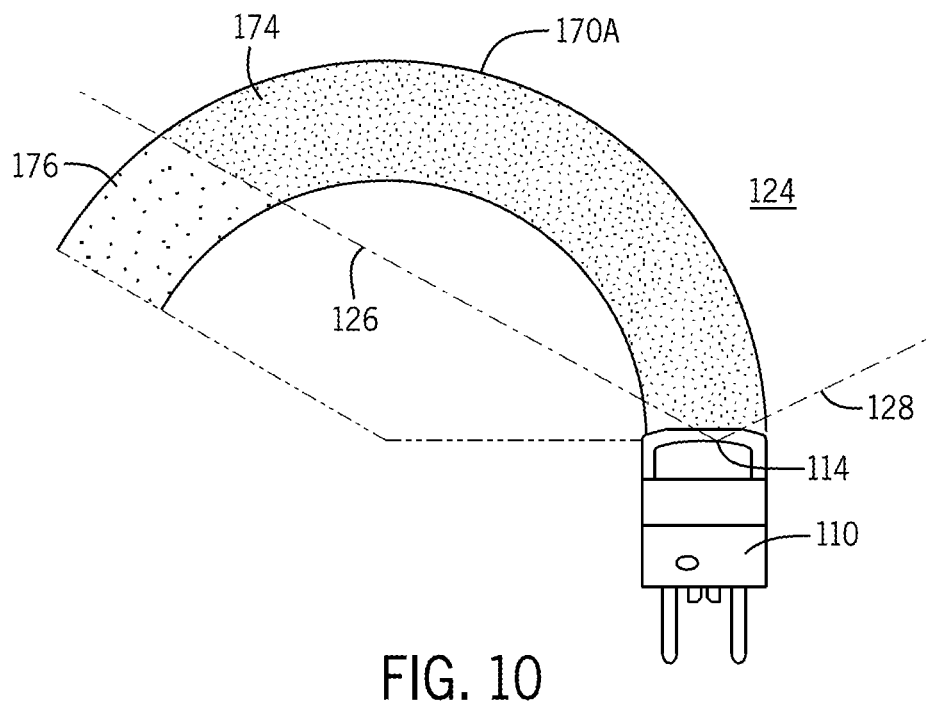
FIG. 10 illustrates an exemplary scanner field and scanner viewing angle of the material handling vehicle shown in FIGS. 1-4B according to aspects of the present disclosure.

In some embodiments, the scanner location, field of view, and range can also be used as an input in determining speed limits for a material handling vehicle. In this regard, FIG. 10 illustrates a projected travel path 170A of the material handling vehicle 100, which, as illustrated, includes an allowed portion 174, and a disallowed portion 176. The allowed portion 174 can be a portion of the path 170A that is within the combined scanner field of view 124 (e.g., between the first boundary 126 and the second boundary 128), which can be determined by a position of the scanner 114 on the vehicle, a configuration of the scanner (e.g., within the lower portion 116 of the material handling vehicle 100 illustrated in FIGS. 3A and 3B, or mounted outside a lower portion 116 of the material handling vehicle 100 in a scanner assembly 130 as shown in FIGS. 4A and 4B), the number of scanners, etc. A speed limit for a given steer angle can be calculated to ensure that a projected stopping distance of the material handling vehicle 100 is within the allowed portion 174 and is not in the disallowed portion 176. Thus, the speed limit for a given steering angle can ensure that the vehicle 100 could be brought to a stop before contact with an object that was previously outside the scanner field of view 124.

Referring back to FIG. 7, the algorithm 350 for determining a speed limit as a function of a steering angle 360 can also receive as input a desired stop distance from an object 356. For example, a speed limit can be determined to ensure that a material handling vehicle can be stopped at a predetermined distance from an object that may fall outside a field of view of a scanner. Referring to FIG. 9, a speed limit of material handling vehicle 100 travelling at a given steer angle can be determined to ensure that the material handling vehicle could stop at a buffer distance D2 from the boundary 128. Thus, the stopping distance of the material handling vehicle can be set to the distance to the boundary 128 for a given steer angle, minus distance D2, and a speed can be selected to achieve this stopping distance given buffer distance D2. The area outside the scanner's 114 field of view 124 may thus be presumed to include objects that may impede travel. In some embodiments, the buffer distance D2 can be set as a default, while in other embodiments, this could be configured by a user (e.g., a manager of a facility). The buffer distance D2 can be measured as a minimum distance between a boundary of a field of view (e.g., boundaries 126, 128) and the point along the projected vehicle path 170 that is closest to the boundary 126, 128 that would intersect with the projected path 170 of the material handling vehicle 100.

In some embodiments, a speed limit calculated for speed in steer algorithm 350 can be calculated according to a series of equations that can use the inputs 352, 354, 356, 358. For example, a first equation or set of equations representing the travel paths of points 140, 144 along the arcs of concentric circles can have a general form R^2. The combined scanner view angle A can be constrained in a second equation or set equations, which can include one or more linear equations. Solving for the first equation and inserting the results into the second equation can produce a third equation, which is a quadratic equation. Aspects of the third equation can represent the intersect point of the travel path and scanner view angle (e.g., scanner view angles A and/or B). A fourth equation can represent a line drawn from the material handling vehicle reference location to the intersect point with a boundary (e.g., boundaries 126, 128), with the magnitude or length of the line representing the derived stopping distance for a given steer angle. The stopping distance (e.g., a distance from the material handling vehicle 100 to stopping distance 172) can be expressed in a fifth equation, which is in the form of quadratic equation. Aspects of the fifth equation can represent a material handling vehicle speed limit for a given steer angle.

As shown in FIG. 7, desired steer angle breakpoints 358 can be included as input into the speed in steer algorithm 350. A speed limit for a material handling vehicle can be set for at least one steering angle range or a plurality of steering angle ranges, and the steer angle breakpoints can be boundaries of these ranges. For example, as shown in the representative speed limit table above, in some embodiments, steer angle breakpoint angles can be defined as 10 degrees, 20 degrees, 30 degrees, 40 degrees, and 50 degrees respectively, and can thus respectively define steering angle ranges of less than 10 degrees, 10-20 degrees, 30-40 degrees, 40-50 degrees, and greater than 50 degrees. In other embodiments, a user could select different breakpoint angles, and could alternatively select more or fewer breakpoint angles. As further shown in the representative table, a first speed limit can be applied when the material handling vehicle 100 is steered within the 10-20 degree range (e.g., 5 mph), and a different speed limit (e.g., 4 mph) can be imposed when a steer angle of the material handling vehicle 100 has a steering angle within the 20-30 degree range. In some embodiments, the breakpoint angles could be hard-coded as defaults into a travel control system of a material handling vehicle (e.g., in memory 160 of control system 150). In other embodiments, a user can select desired breakpoint angles (e.g., using the inputs 156 or the inputs 310 shown in FIG. 6). The output of the speed in steer algorithm could thus be a table (e.g., the representative speed limit table shown above) which assigns speed limits to ranges of steering angles of a material handling vehicle, based on the inputs 352, 354, 356, and 358. In some embodiments, the speed of the material handle 100 can be reduced or limited based on a communication from the processor 152 to the motor control unit 155 over the CAN bus 168, as shown in FIG. 6.

Figure 11:
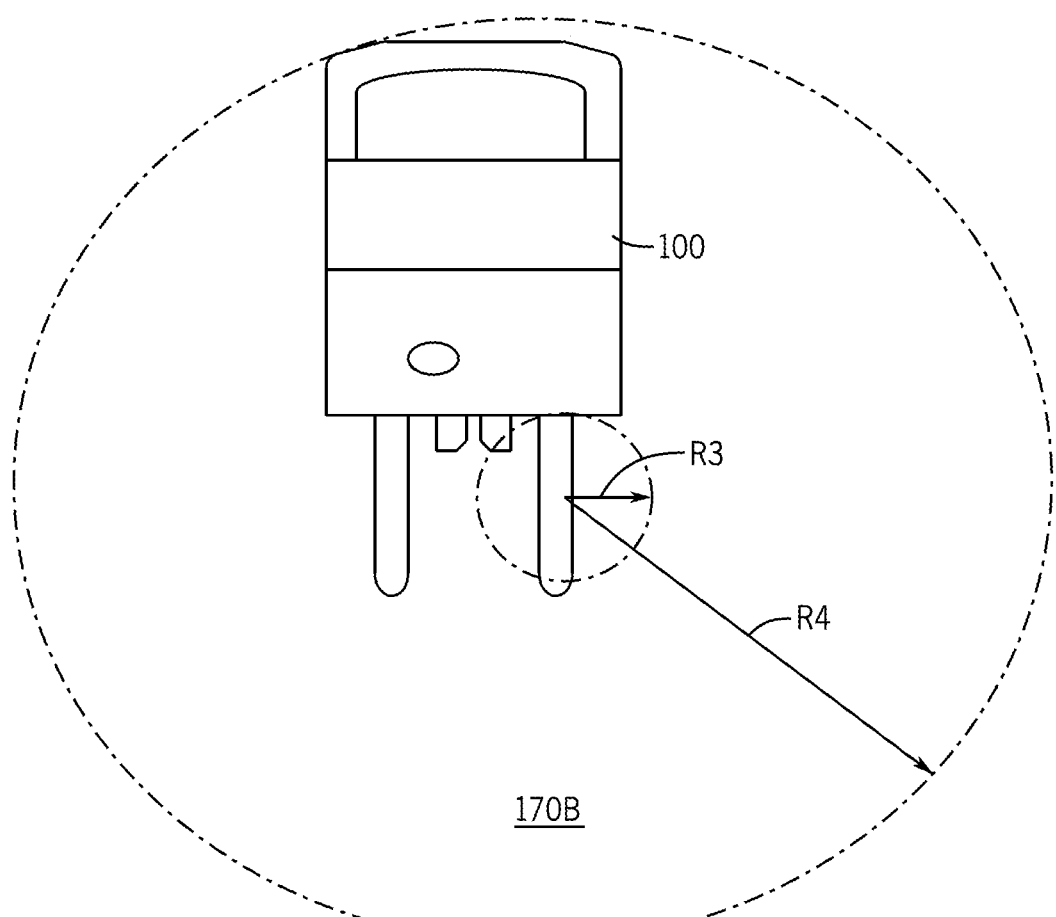
FIG. 11 illustrates concentric circles associated with a pivot steer maneuver of the material handling vehicle shown in FIGS. 1-4B according to aspects of the present disclosure.

In some embodiments, a speed limit table of a travel control system can include speed limits that are associated with specific maneuvers of a material handling vehicle, and these speed limits can be static, rather than being generated by an algorithm (e.g., algorithm 350). For example, two frequent steering maneuvers include right angle turns (i.e., a 90 degree turn), and a pivot (e.g., a 180 degree), as illustrated in FIG. 11. Right angle turns are commonly performed when turning into an aisle, turning out of an aisle, and turning around a corner. Pivots are commonly performed for a turnaround out of aisle, load drop off, and load engagement. As illustrated in FIG. 9, a projected path 170B during a pivot maneuver can be tightly circumscribed. Given the frequency with which this maneuver must be made, and the lower likelihood of impeded travel given a smaller projected path 170B, it may be impractical to limit a speed limit of the vehicle to allow the scanner 114 to scan the area in the path of travel, as this could be quickly performed by an operator. Limiting a speed in these maneuvers, in accordance with algorithm 350 can thus increase travel time but without reducing a speed limit. Thus, in some embodiments, a cut-off angle can be defined for a pivot steer maneuver, which can allow the material handling vehicle 100 to proceed without a speed limit, or with a speed limit that is greater than what would be provided in the algorithm 350 when engaged in maneuvers such as a right angle turn or a pivot. Further, a steer angle for a pivot or a right angle turn can be less than 180 degrees or 90 degrees respectively, and thus, a 90 degree turn of the material handling vehicle 100 could be accomplished by maintaining travel at another steer angle for a period of time, until the material handling vehicle 100 is oriented at a 90 degree angle relative to an initial position. For example, according to the representative table shown above, a steer angle cutoff of 75 degrees can be incorporated to allow the material handling vehicle 100 to travel (i.e., pivot) at a higher maximum speed when the steer angle of the material handling vehicle 100 is above a predefined steer angle that constitutes pivot. Thus, according to the representative table, the material handling vehicle 100 can travel at speeds up to 3 mph during a pivot operation, when the steer angle of the material handling vehicle 100 exceeds 75 degrees. In some embodiments, when the cut-off angle is detected, the speed limit can be allowed to be higher than the speeds identified in the generated speed limit table. In some embodiments, the pivot angle and associated speed limit can be included in the speed limit table. In some embodiments, a cut-off pivot angle and an associated speed limit can be included in the material handling vehicle information provided at step 204 of vehicle travel control system 200. In some embodiments, a cut-off pivot angle and an associated speed limit can be set by a user of the material handling vehicle.

Referring back to FIG. 5, the travel control system 200 can allow full travel of material handling vehicle 100 at step 210, once the speed limit table has been generated at step 208. In other embodiments, full travel can be allowed before a speed limit table is generated, or during a speed limit table generation. In other embodiments, a material handling vehicle may not be allowed to travel until the speed limit table has been generated. Full travel allows the material handling vehicle 100 to operate without the temporary restrictions imposed at step 206, for example, and can permit operation of the material handling vehicle 100 in accordance with the speed limits generated at step 208.

At step 212, a speed and steer angle of material handling vehicle 100 can be sampled at a given time interval. The speed can be obtained from sensors of a material handling vehicle, which can include, for example, accelerometers, gyroscopes, or some other sensing devices known to those of ordinary skill in the art. The speed and steer angle of a material handling vehicle (e.g., material handling vehicle 100, 10) can be sampled or obtained at set time intervals. In some non-limiting examples, speed and steer angle can be sampled, once per millisecond, or once every 10 milliseconds, or once every 100 milliseconds, once every second, or once every 5 seconds, or once every 10 seconds. In other embodiments, the speed and steer angle of a material handling vehicle can be sampled upon completion of steps 214, 216, 218, and 220. In some embodiments, a polling or sampling interval can be configured by a user.

At step 214, the travel control process can evaluate whether the speed of the material handling vehicle 100, obtained at step 212, exceeds the speed limit generated at step 208 for the current steer angle of the material handling vehicle. When the speed of the material handling vehicle 100 exceeds the speed limit for the current steer angle of the material handling vehicle, a speed of the material handling vehicle can be reduced at step 216. Reducing the speed of the material handling vehicle can reduce the risk of contact with an object, as described above, and can also be beneficial in providing additional time for the scanner to adjust to the changed angle of the material handling vehicle 100, and scan for additional potential objects in the path of the material handling vehicle 100. The speed of the material handling vehicle 100 can be reduced by a predetermined increment (e.g., 0.1 mph) which can slow the material handling vehicle 100 without producing an unnecessarily uncomfortable change in acceleration, or deceleration. For example, using the representative speed limit table above, as the material handling vehicle 100 is traveling at 5 mph and steers beyond the +/−10 degree breakpoint, the travel control system 200 can bring the material handling vehicle 100 to the next speed set point (e.g., 4 mph) in predetermined increments, e.g., 0.1 mph, therefore expanding the viewing range of the object sensor system. If the operator continues to steer and increases the steer angle, the travel control system 200 can continue to adjust the material handling speed within the speed limit table ranges to maintain maximum viewing range. In some embodiments, including as shown in FIG. 5, after decrementing a speed at step 216, the vehicle travel control system 200 can again sample the speed and steer angle of the material handling vehicle 100, and evaluate if additional deceleration is required, or if the trajectory of the material handling vehicle is within the speed limits generated at step 208. In other embodiments, if a speed of the material handling vehicle exceeds a speed limit for the current steer angle, the vehicle can be decelerated by an amount necessary to bring the speed of the material handling vehicle beneath the speed limit before the speed and steer angle are sampled again.

If the speed of the material handling vehicle is beneath a speed limit for the given steer angle, the system analysis can be completed at step 218, and normal operation of the material handling vehicle 100 can resume at step 220. Normal operation can include unrestricted operation, for example, where the system is not reducing a speed of the material handling vehicle 100 or otherwise overriding operating parameters of the material handling vehicle 100.

In some embodiments, operation of the material handling vehicle 100 can be halted or paused if the system encounters an error 222 and a step cannot be completed. For example, as shown in FIG. 5, if the system 200 cannot obtain information of the material handling vehicle at step 204 to allow the system to generate the speed limit table at 208, this can constitute an error 222, and operation of the material handling vehicle could be prevented, to ensure that the material handling vehicle 100 cannot be operated without the object detection system properly calibrated. On an error 222, the system 200 can impose a wait period at 224 before attempting to again resume the process and start the material handling vehicle 100 at step 202. In some embodiments, for example, the user of a material handling vehicle must wait a predetermined time before attempting to operate the material handling vehicle 100 again. In other embodiments, the system can automatically perform a retry operation after a given time interval, which could be a system parameter than can be configured by a user, for example. Errors 222 can occur at other steps of the travel control system 200, including, for example, when sampling speed and steer angle data at step 212. In some embodiments, an error may prompt other system responses. For example, when an error occurs, operation of the material handling vehicle can be permitted with a reduced speed limit for the vehicle (e.g., 1 mph).

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A travel control system to augment a supplemental object detection system of a material handling vehicle, the travel control system comprising:
   a material handling vehicle;
   a steer angle sensor;
   a speed sensor;
   a motor control unit; and
   a processor operatively connected to the steer angle sensor, the speed sensor, and the motor control unit, the processor being configured to:
   determine, based on intrinsic aspects of the material handling vehicle, a first speed limit associated with a first breakpoint angle;
   receive from the steer angle sensor, a first steer angle;
   receive, from the speed sensor, a first vehicle speed;
   when the first steer angle exceeds the first breakpoint angle and is less than a pivot breakpoint angle, and the first speed exceeds the first speed limit, generate a signal to the motor control unit to decrease a speed of the material handling vehicle, and
   when the first steer angle equals or exceeds the pivot breakpoint angle, reduce or remove a limit on a speed of the material handling vehicle.

2. The travel control system of claim 1, wherein the processor is configured to determine a stopping distance of the material handling vehicle, based on the intrinsic aspects, and wherein the first speed limit is determined, at least in part based on the stopping distance.

3. The travel control system of claim 2, further comprising a first scanner that is mounted on the material handling vehicle, the first scanner being configured to detect objects within a field of view, the field of view having a first boundary and a second boundary.

4. The travel control system of claim 3, wherein the stopping distance is within the field of view of the first scanner.

5. The travel control system of claim 3, further comprising a second scanner, wherein the field of view is a combination of a field of view of the first scanner and a field of view of the second scanner.

6. The travel control system of claim 3, wherein the speed limit of the material handling vehicle is determined so that the stopping distance of the material handling vehicle is separated from the first boundary and the second boundary by at least a buffer distance.

7. The travel control system of claim 1, wherein the first breakpoint angle is one of a plurality of breakpoint angles, and wherein a speed limit is determined for each of the plurality of breakpoint angles.

8. The travel control system of claim 7, wherein each of the breakpoint angles is determined based on a user input.

9. The travel control system of claim 1, wherein a speed of the material handling vehicle is restricted beneath a temporary speed limit until the first speed limit is determined.

10. The travel control system of claim 1, wherein when the steer angle exceeds the pivot breakpoint angle, a corresponding speed limit of the material handling vehicle is not determined based on intrinsic properties of the material handling vehicle.

11. The travel control system of claim 1, wherein the intrinsic aspects of the material handling vehicle include at least one of a vehicle weight, vehicle height, vehicle width, drive wheel location, and non-drive wheel locations.

12. A method in a computer-implemented system for controlling travel of a material handling vehicle, the method comprising:
receiving, at a control system of the material handling vehicle, intrinsic aspects of the material handling vehicle;
determining, based on the intrinsic aspects of the material handling vehicle and a configuration of a scanner mounted on the material handling vehicle, at least one speed limit associated with at least one steering angle range of the material handling vehicle;
receiving, at the control system, a current speed of the material handling vehicle;
receiving, at the control system, a current steering angle of the material handling vehicle;
when the current steering angle is within the at least one steering angle range and the current speed exceeds the at least one speed limit associated with the at least one steering angle range, generating a signal to a motor control unit to reduce a speed of the material handling vehicle, and
when the current steering angle equals or exceeds a pivot breakpoint angle, reducing or removing a speed limit of the material handling vehicle.

13. The method of claim 12, wherein the at least one steering angle range comprises a plurality of steering angle ranges, each of the plurality of steering angle ranges being associated with a corresponding one of a plurality of speed limits.

14. The method of claim 12, wherein the configuration of the scanner includes a first boundary and a second boundary at least partially defining a field of view of the scanner, and wherein the at least one speed limit is determined so that a stopping distance for the material handling vehicle is within the field of view when the current steer angle of the material handling vehicle is within the at least one steering angle range.

15. The method of claim 14, further comprising receiving, at the control system, an input including a buffer distance, wherein the stopping distance is separated from the first boundary and the second boundary by a distance that is at least as large as the buffer distance.

16. The method of claim 12, wherein the intrinsic aspects of the material handling vehicle include at least one of a vehicle weight, vehicle height, vehicle width, drive wheel location, and non-drive wheel locations.

17. The method of claim 12, further comprising receiving, at the control system, an input including a first breakpoint angle, wherein the at least one steering angle range is at least partially defined by the first breakpoint angle.

18. A computerized control system for a material handling vehicle, the computerized control system comprising:
an object detection system of the material handling vehicle including at least one scanner having a field of view defined between a first boundary and a second boundary;
a motor control unit;
one or more processors;
a memory storing one or more programs for execution by the one or more processors, the one or more programs comprising instructions for performing a method for controlling a travel of the material handling vehicle, the method comprising:
receiving, at the one or more processors, a current speed of the material handling vehicle and a current steering angle of the material handling vehicle;
determining, based at least in part on the current speed and current steering angle, a stopping distance of the material handling vehicle;
determining if the stopping distance is within the scanner field of view;
determining if a distance between the stopping distance and either of the first boundary and the second boundary is less than a buffer distance; and
if either of the distance between the stopping distance and either of the first boundary and the second boundary is less than a buffer distance, and the stopping distance is outside of the scanner field of view, generating a signal to the motor control unit to reduce a speed of the material handling vehicle.

19. The computerized control system of claim 18, further comprising determining at least one speed limit associated with at least one range of steering angles, wherein determining if the stopping distance is within the scanner field of view comprises comparing the current speed to the at least one speed limit when the current steering angle is within the at least one range of steering angles.

20. The computerized control system of claim 18, wherein upon receiving the signal from the one or more processors, the motor control unit reduces the speed of the material handling vehicle by a pre-defined increment.

* * * * *